(No Model.) 2 Sheets—Sheet 1.

J. T. HOVIS.
VEHICLE SPRING.

No. 396,744. Patented Jan. 29, 1889.

Witnesses
Inventor
J. T. Hovis.
By his Attorneys (No Model.) 2 Sheets—Sheet 2.

J. T. HOVIS.
VEHICLE SPRING.

No. 396,744. Patented Jan. 29, 1889.

Witnesses
Geo. J. Thorpe
H. F. Riley

Inventor
J. T. Hovis
By his Attorneys

UNITED STATES PATENT OFFICE.

JOHN T. HOVIS, OF CLINTONVILLE, PENNSYLVANIA.

VEHICLE-SPRING.

SPECIFICATION forming part of Letters Patent No. 396,744, dated January 29, 1889.

Application filed July 31, 1888. Serial No. 281,501. (No model.)

*To all whom it may concern:*

Be it known that I, JOHN T. HOVIS, a citizen of the United States, residing at Clintonville, in the county of Venango and State of Pennsylvania, have invented new and useful Improvements in Vehicles, of which the following is a specification.

The invention relates to improvements in vehicles, pertaining more particularly to the springs thereof, and especially to that class known as "torsion-springs;" and it consists in the construction and novel combination of parts, hereinafter described, illustrated in the accompanying drawings, and pointed out in the appended claims.

Figure 1:
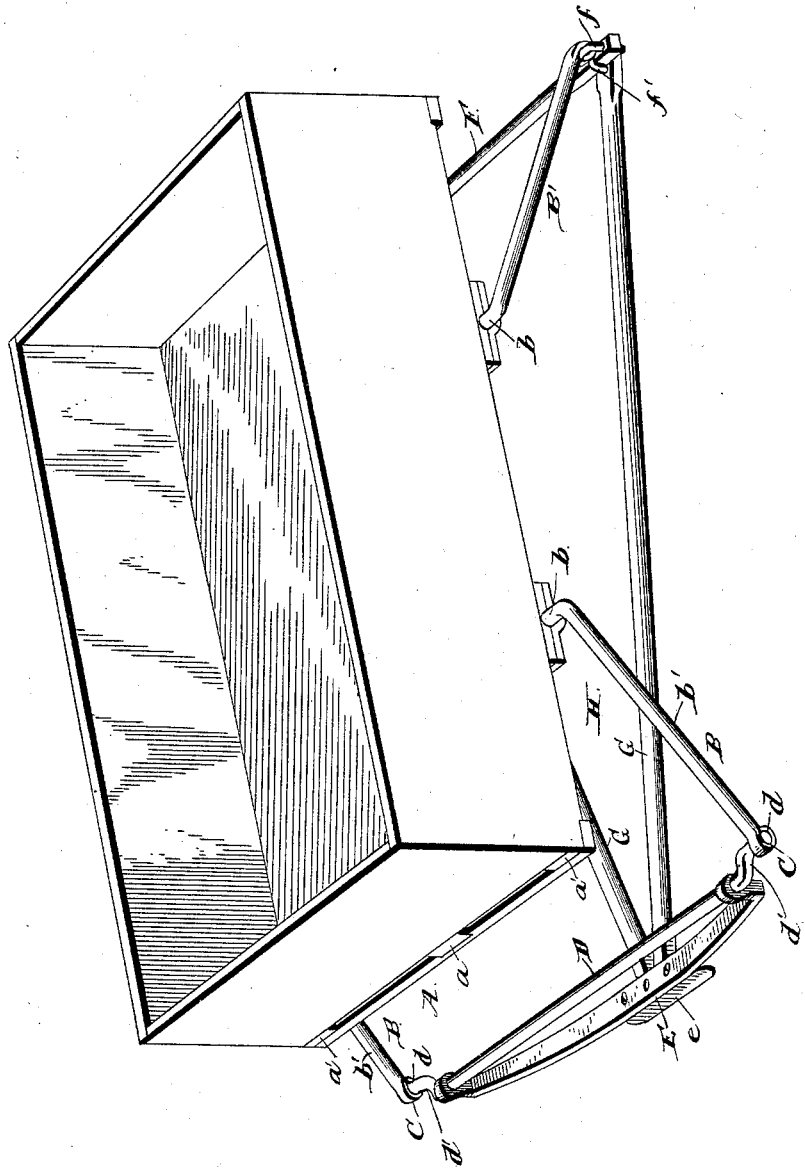
Figure 2:
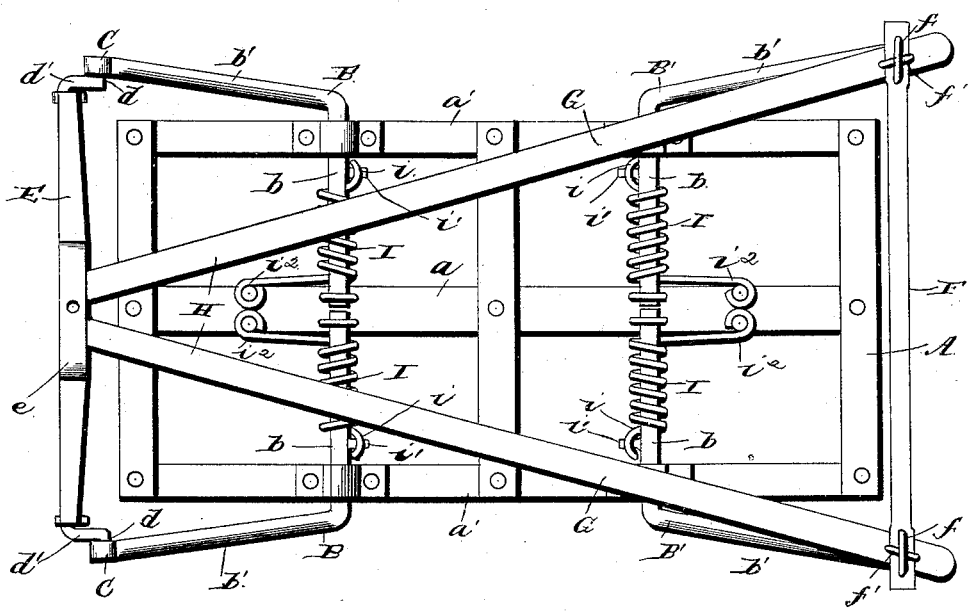
Figure 3:
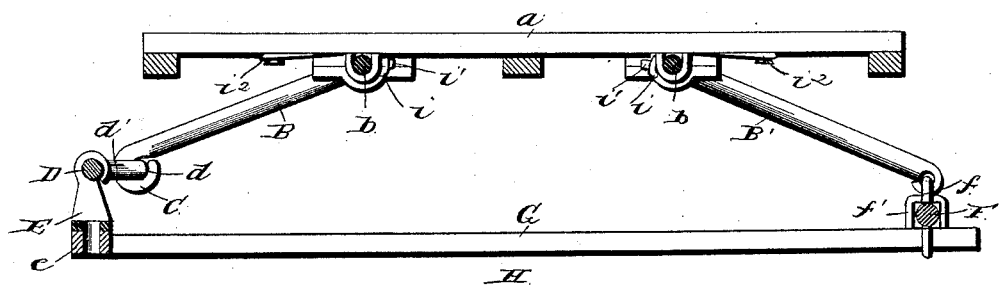

Figure 1 of the drawings represents a perspective view of a vehicle-body and attachment embodying the invention. Fig. 2 represents a reversed plan view of the same. Fig. 3 is a vertical longitudinal sectional view of Fig. 1.

Referring to the drawings by letter, A designates a frame attached to or forming part of the floor of the wagon-body, and composed of the side bars, $a$, the central longitudinal bar, $a'$, and suitable transverse central and end bars, as shown.

B B' are similar metal angle-bars situated, respectively, near the rear and front ends of said frame, and each composed of a transverse arm, $b$, and a longitudinal arm, $b'$, having on its end an eye, C, and forming a slightly-obtuse angle with the arm $b$, which angle faces the frame.

The arms $b$ of the angle-bars B rest in bearings secured to the under surfaces of the corresponding side bars, $a$, and central bar, $a'$, a suitable distance from the front end of the frame A, and the arms $b'$ extend frontward, while the arms $b'$ of the angle-bars B' extend rearward, and their arms $b$ have similarly-situated bearings near the rear of the frame.

In the eyes C of the angle-bars B rest the journals $d$ of the similar cranks $d'$ on the ends of the transverse bar D, which has bearings in the upturned perforated ends of the front spring, E, secured to the lower surface of which is the head-block $e$.

$ff$ are metal loops engaged in the eyes C of the rear angle-bars, B', and F is a transverse bar connected to the rear angle-bars, B', by said loops, the bars of which pass through perforations in the bar F near its ends.

G G are forwardly-converging bars, the rear ends of which pass through the loops $f$ below the bar F, and are connected to said bar by metal loops $f'$, which pass through perforations in said ends, and the front ends of which are secured in close proximity to the head-block.

The eyes C of the rear angle-bars, the bar F, and the bars G may be secured together in any other suitable manner than that described, and the said bars F G form with the head-blocks a frame, H, which, with the front transverse spring, E, and crank-bar D, connect the front and rear angle-bars and cause them to move together when the vehicle-body is pressed downward.

I I are coiled springs, with the outer ends, $i$, hooked below the studs $i'$, projecting inward from the angle-bars B B', surrounding said bars inward from said studs, and having their inner portions, $i^2$, extending toward the corresponding ends of the frame and secured to the central bar, $a'$, of the latter. The said springs are compressed when the vehicle is loaded, and by their action turn the arms $b'$ downward.

Having described my invention, I claim—

1. The combination of the frame A, having the side bars, $a$, and central bar, $a'$, the angle-bars B B', having the transverse arms $b$, provided with the studs $i'$, and longitudinal bars $b'$, forming slightly-obtuse inner angles with the arms $b$, and having the eyes C at their ends for the attachment of connecting portions of the running-gear, and the coiled springs I, having their ends $i$ hooked under the studs $i'$ and their ends $i^2$ extended toward the corresponding ends of the frame A and secured to the central longitudinal bar thereof, substantially as specified.

2. The combination, with the frame A, the journaled angle-bars B B', and the coiled springs I, attached at one end to the said bars and at the other end to the frame A, of the transverse crank-bar D, with the journals of its end cranks in the eyes C of the front angle-bars, B, and having bearings in the upturned perforated ends of the front transverse spring, and a frame connecting said springs and the ends of the longitudinal arms of the rear angle-bars, B', substantially as specified.

3. The combination, with the frame A, the angle-bars B B', and the coiled springs I, of the crank-bar D, having the crank-journals $d$ at its ends, which journals have bearings in the eyes C of the crank-bars B, the front spring, E, having upturned ends provided with perforations to form bearings for said crank-bar, and the connecting-frame H, formed of the head-block $e$, secured centrally to said spring, the rearwardly-diverging bars G, and the transverse bar F, which bars G and F are secured to the ends of the longitudinal arms of the rear angle-bars, B'.

In testimony that I claim the foregoing as my own I have hereto affixed my signature in presence of two witnesses.

JOHN T. HOVIS.

Witnesses:
SCOTT JAMISON,
FINLEY JAMISON.